United States Patent [19]

Jacques et al.

[11] Patent Number: 5,353,901
[45] Date of Patent: Oct. 11, 1994

[54] PILOT OPERATED NO-BACK

[75] Inventors: David L. Jacques; David J. Lang, both of Rockford, Ill.

[73] Assignee: Sundstrand Corporation, Rockford, Ill.

[21] Appl. No.: 950,196

[22] Filed: Sep. 24, 1992

[51] Int. Cl.⁵ ............................................. B60T 7/12
[52] U.S. Cl. ................................. 192/8 R; 192/9; 188/134; 244/75 R
[58] Field of Search ................ 192/7, 8 R, 9, 35; 188/134; 244/75 R, 213

[56] References Cited

U.S. PATENT DOCUMENTS

| | | | |
|---|---|---|---|
| 2,649,941 | 8/1953 | Doebeli | 188/134 X |
| 2,659,466 | 11/1953 | Ochtman | 192/8 R |
| 2,834,443 | 5/1958 | Olchawa | 192/8 R |
| 2,933,171 | 4/1960 | Kraeplin | 192/35 |
| 3,596,740 | 8/1971 | Nau | 188/134 X |
| 3,797,614 | 3/1974 | McCay, Jr. | 192/8 R |
| 4,121,795 | 10/1978 | Craven | 244/213 |
| 4,441,675 | 4/1984 | Boehringer et al. | 244/213 |
| 4,483,429 | 11/1984 | Tiedeman | 192/8 R |
| 5,141,084 | 8/1992 | Lang et al. | 192/8 R |

Primary Examiner—Richard M. Lorence
Attorney, Agent, or Firm—Wood, Phillips, VanSanten, Hoffman & Ertel

[57] ABSTRACT

Size problems and large power requirements for operating a no-back are avoided in a pilot operated no-back including a housing (10) journaling input and output shafts (12, 18). A brake disc pack (32) is disposed within the housing (10) and is compressible to prevent rotation of the output shaft (18). A ball ramp mechanism (24) has a rotary input plate (26) and a rotary output plate (28), the latter being axially movable to compress the brake disc pack (32). A selectively operable electric pilot brake (70) is provided to retard rotation of the output plate (28) but allow motion via opposing load if disengaged.

15 Claims, 1 Drawing Sheet

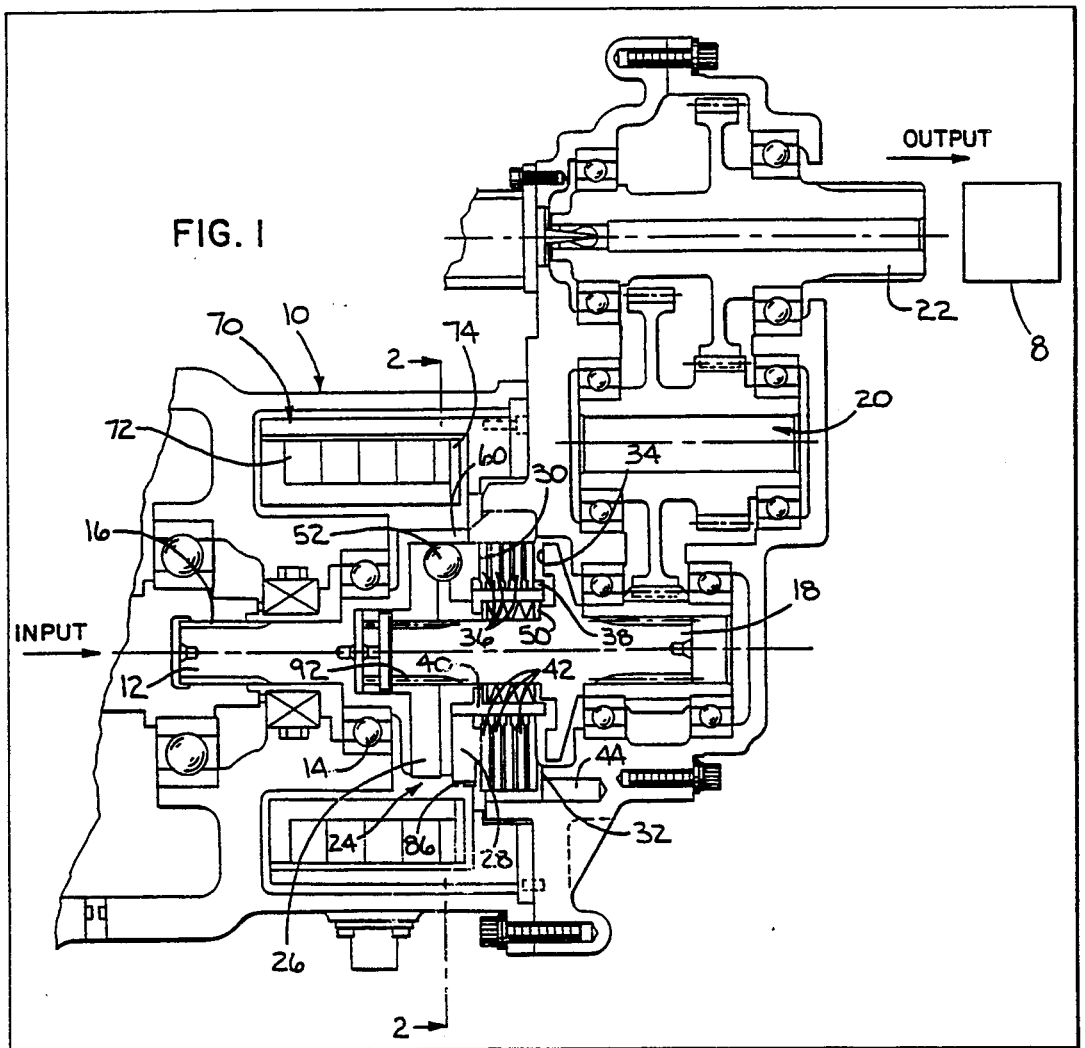
FIG. 1
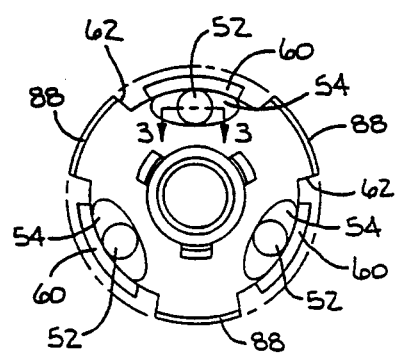
FIG. 2
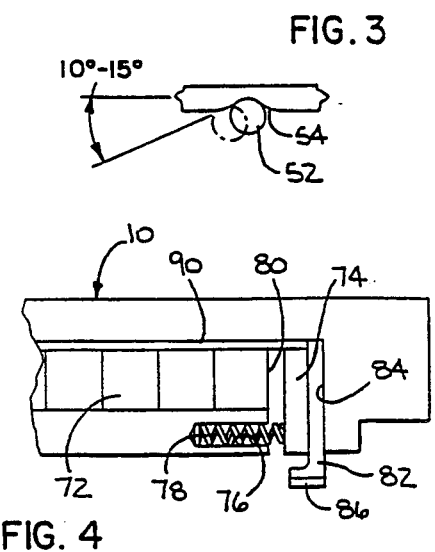
FIG. 3
FIG. 4

PILOT OPERATED NO-BACK

FIELD OF THE INVENTION

This invention relates to no-backs, and more particularly, to a pilot operated no-back.

BACKGROUND OF THE INVENTION

So called "no-backs" are employed in mechanical drive systems where it is necessary to prevent an aiding load from over-running the drive or preventing an opposing load from reversing the drive. The environment in which no-backs perhaps are most frequently found is that of aircraft that employ electrical or hydraulic systems to power moveable aircraft control surfaces as, for example, slats or flaps. In this environment, no-backs are employed to prevent any movement of the control surface other than that which results from operation of a prime mover for an actuating mechanism for the control surface. A typical no-back has a releasable brake associated with the no-back output shaft as well as an input shaft connected to the prime mover and coupled to the output shaft. A coupling between the input and output shafts is employed and usually is a ball ramp mechanism which is operable, in response to the transmission of torque from the output shaft to the input shaft to engage the brake to prevent movement of the output shaft, and thus assure that the associated control surface will remain in the position in which it was originally placed by operation of the prime mover.

Desirably, activation/deactivation of the no-back will not require the use of hydraulic pressure because of the possibility of an aircraft hydraulic system failure as well as the need to be redundant. Consequently, electric power may be employed. Where, however, the electric power is employed to engage/disengage the no-back brake, power requirements will be high and the mass of the electrical actuator undesirably large.

It is also desirable that in some instances, torque can be transmitted from the output shaft to the input shaft. For example, in a typical control surface drive system there may be power drive units (PDU's) at each end of an elongated rotary drive train. The two PDU's are employed for redundancy purposes and a so called throughshaft will typically extend between the PDU's and operate a plurality of spaced actuators, all connected to the control surface. Typically, the two PDU's will be driven by two different hydraulic systems, also used for redundancy purposes. Should one system fail, it is necessary to be able to drive the entire throughshaft and associated actuators by the PDU whose hydraulic system remains operative. That, in turn, means that the throughshaft will be rotating from one end to the other, including at the output of the PDU whose hydraulic system had failed. If the no-back associated with that PDU cannot be disengaged, the throughshaft cannot be rotated by the PDU with the operative hydraulic system and the aerodynamic configuration of the aircraft control surface cannot be altered. One means to avoid this problem is to provide for cross connection of hydraulic systems so that both PDU's, while normally having their own hydraulic systems, can be operated by a common single hydraulic system in case one hydraulic system fails. This requires additional hydraulic conduit valving mechanisms and controls therefore which undesirably add to the weight and bulk of the aircraft.

The present invention is directed to overcoming one or more of the above problems.

SUMMARY OF THE INVENTION

It is the principal object of the invention to provide a new and improved no-back. More specifically, it is an object of the invention to provide a pilot operated no-back that will provide the usual no-back functions and which may be selectively deactivated when desired. It is also an object of the invention to provide a no-back that may be operated with a minimum power requirement.

An exemplary embodiment of the invention achieves the foregoing object in a pilot operated no-back that includes a housing with input and output shafts journalled in the housing. A brake disc pack is within the housing and is compressible to prevent rotation of the output shaft. A ball ramp mechanism is provided and has a rotary input plate coupled to the input shaft and a rotary output plate axially movable to compress the brake disc pack. A selectively operable pilot brake is provided for retarding rotation of the output plate.

In a preferred embodiment, the pilot brake includes an electrical coil and an armature movable relative to the electrical coil.

In a highly preferred embodiment, the pilot operated no-back includes a housing with an input shaft journalled in the housing and an output shaft journalled in the housing. A coupling interconnects the shafts. A ball ramp mechanism is provided and has input and output plates. A main brake is disposed within the housing and is operable by the ball ramp mechanism to prevent movement of the output shaft if the torque applied to the output shaft exceeds the torque applied by the pilot brake. An electrically operable pilot brake is disposed in the housing and is operable to condition the ball ramp mechanism for relative movement between the two plates thereof.

In a preferred embodiment, the output plate is engagable with the main brake to engage the same and the pilot brake is operable to ground the output plate to the housing.

Preferably, the input shaft includes a lost motion connection to the output plate.

In a highly preferred embodiment, the lost motion connection includes an input shaft with axially directed fingers received in notches in the input and output plates. The notches are sufficiently large to accommodate movement of the fingers in arcuate paths of limited length.

In a highly preferred embodiment, the pilot brake includes an electrical coil in the housing and located about the input shaft. A ring-like armature is disposed about the input shaft and is movable toward and away from the coil. A pilot brake plate is sandwiched between the armature and a surface of the housing and means are provided for biasing the armature toward the housing surface.

Preferably, the pilot brake plate is splined to the output plate.

The invention also contemplates ball ramps in facing surfaces of the input and output plates, wherein the ball ramps have shallow ramp angles. In a highly preferred embodiment, the shallow ramp angles are in the range of about ten degrees to about fifteen degrees.

Other objects and advantages will become apparent from the following specification taken in connection with the accompanying drawings.

DESCRIPTION OF THE DRAWINGS

FIG. 1 is a sectional view of a no-back made according to the invention;

FIG. 2 is a sectional view taken approximately along the line 2—2 in FIG. 1;

FIG. 3 is a fragmentary sectional view taken approximately along the line 3—3 in FIG. 2; and FIG. 4 is an enlarged, fragmentary sectional view of part of a pilot operated brake mechanism employed in the no-back.

DESCRIPTION OF THE PREFERRED EMBODIMENT

An exemplary embodiment of a no-back made according to the invention is illustrated in the drawings and with reference to FIG. 1 is seen to include a housing, generally designated 10. An input shaft 12 is journalled within the housing by means of bearings 14. By means of splines 16, the input shaft 12 may be connected to a source of rotary power as, for example, a hydraulic motor (not shown).

Also within the housing 10 is an output shaft 18. Rotation of the output shaft 18 may be conveyed by a series of gears, generally designated 20 to a shaft 22 or the like which may be coupled to the throughshaft (not shown) for movable control surfaces 8 of aircraft 6 that is to be driven by the PDU.

Within the housing 10 is a ball ramp mechanism, generally designated 24, which couples the shafts 12 and 18 to each other. The ball ramp mechanism includes an input plate 26 and an output plate 28. One axially facing surface 30 of the output plate 28 abuts one side of a brake disc pack, generally designated 32. As is well known, the brake disc pack may be compressed against a reaction surface 34 on the shaft 18 and includes alternating brake discs 36 which are coupled by a spline 38 on a sleeve 40 to the output plate 28. Other discs 42 in the pack 32 extend radially outward of the discs 36 to be held against rotation by a series of pins 44 spaced around the periphery of the pack 32. The pins 44 are, of course, fastened to the housing 10. A spring 50 disposed about the output shaft 18 acts against the sleeve 40 to bias the same to the left as viewed in FIG. 1 which is to say, the spring 50 biases the output plate 28 toward to the input plate 26 and acts to disengage the brake disc pack 32.

Three balls 52 are disposed in facing ball ramps 54 in the facing sides of the plates 26 and 28. The ball ramps 54 may be conventionally configured in terms of shape but according to the invention, it is desirable that the same have a relatively shallow ramp angle as illustrated in FIG. 3. Preferably, the ramp angle will be in the range of about ten degrees to about fifteen degrees.

Returning to the input shaft 12, the same includes a series of three axially directed fingers 60. The fingers 60 couple the input and output plates 26 and 28 to the shaft 12 for rotation therewith. However, it is to be understood that at least in the case of the output plate 28, the same is provided with a series of notches 62 (FIG. 2), one for each of the fingers 60, for receiving the fingers. As can be seen in FIG. 2, the notches 62 have a sufficient length so as to allow limited arcuate motion of the fingers 60 within the notches 62 before encountering the ends thereof. Thus, a limited lost motion connection is defined.

The no-back is completed by a pilot brake, generally designated 70. The pilot brake includes an electrical coil 72 and a ring-like armature 74. Both the coil 72 and the armature 74 are concentric with the shaft 12 and it will be appreciate that when the electrical coil 72 is energized, the armature 74 will move axially within the housing 10 toward the coil 72.

To provide for reverse movement of the armature 74, the housing includes a series of axially facing bores 76 into which compression coil springs 78 are introduced. The compression coil springs 78 extend out of the bores 76 adjacent one end 80 of the coil 72 and engage the armature 74 to bias the same away from the coil 72.

A pilot brake plate 82 is located between the armature 74 and an axially facing brake surface 84 on the interior of the housing 10. The pilot brake plate 82 is also ring like, disposed about the shaft 12 and includes a spline 86 on its radially inner surface. The spline 86 is engaged with a mating spline 88 on the periphery of the output plate 28 between the notches 62.

Preferably, the armature 74 is splined to the housing 10 to hold the same against rotation. Such a spline is shown somewhat schematically at 90.

In normal operation, input torque is conveyed via the spline 16 to the input shaft 12. The shaft 12 drives both the plates 26 and 28 by means of the fingers 60. In normal operation, both plates 26 and 28 are driven in unison and so, by reason of the bias of the spring 50, the balls 52 will be centered in the deepest part of their ball ramps 54, releasing any compression on the brake disc pack 32. The torque applied to the input plate 26 is conveyed to the output shaft by reason of a splined connection 92 interconnecting the input plate 26 and the output shaft 18. At this time, the coil 72 will be energized to draw the armature 74 away from the pilot brake plate 82. Thus, the pilot brake plate 82 will be free to rotate with the output plate 28 by reason of the connection via the spline 86 thereto.

When input torque is not present to react against loading on the output shaft 18, the coil 72 will be deenergized, allowing the compression coil springs 78 to bias the armature 74 against the pilot brake plate 82 to ground the same against the housing surface 84. When this occurs, the output plate 28 will be grounded against the housing 10 and its rotation resisted. Any output loading on the shaft 18 causing the same to tend to rotate will effect relative rotation between the input plate 26 which will rotate with the shaft 18 and the output plate 28 which is held stationary against the housing 10. The balls 52 will translate up their respective ramps 54 causing axial separation of the plates 26 and 28, with the output plate 28 compressing the brake disc pack 32 against the reaction surface 34 on the output shaft 18. This will ground the output shaft 18 via the plates 42 to the housing 10, preventing rotation of the output shaft 18. In short, classic no-back operation is provided in this mode.

In the event it is desired to transmit loading from the output shaft 18 to the input shaft 12 as, for example, in a redundant system as mentioned previously, it is only necessary to energize the coil 72 to thereby release the pilot brake 70. When this occurs, the output plate 28 will be released and as the torque at the output shaft 18 is transmitted to the input plate 26, and thus into the fingers 60 of the shaft 12, the plates 26 and 28 will promptly realign, releasing the main brake provided by the brake disc pack 32.

Those skilled in the art will immediately appreciate that a no-back made according to the invention provides a substantial size advantage in that a relatively small pilot brake such as the pilot brake 70 can be utilized in lieu of a large electromagnetic main brake. The use of the very shallow ramp angles in the arrangement mentioned previously provides a large gain which is proportional to the ratio of the compressive force supplied to the pack 32 for halting rotation of the shaft 18 and the force applied by the electrically operated pilot brake.

Furthermore, even in the situation where the pilot brake becomes inoperative, it is still possible to operate via the prime mover because the fingers 60 on input shaft 12 pick up the output plate 28, and thus the pilot brake plate 82 as well. In this mode, motion is possible, but with some torque loss and heat generation within the pilot brake.

A substantial power savings is achieved over hydraulically activated no-back systems. Such a hydraulically operated system would require the use of at least one electrical control valve as well as pressurized hydraulic fluid to operate. The present invention may be activated on approximately the same amount of power as would be used by the electrical control valve and thus, that power required to provide hydraulic fluid under pressure in a hydraulic system is not at all required in the present system, thereby providing a substantial conservation of power.

We claim:

1. A pilot operated no-back comprising:
   a housing;
   an input shaft journalled in said housing;
   an output shaft journalled in said housing;
   a coupling interconnecting said shafts; and including
   a ball ramp mechanism having input and output plates;
   an electrically operable pilot brake in said housing and operable to selectively apply torque to said output shaft through connection with at least one of said plates; and
   a main brake within said housing and operable by connection with said ball ramp mechanism to prevent movement of said output shaft if torque is applied to said output shaft from a source external to said housing which exceeds said torque applied by said pilot brake.

2. The pilot operated no-back of claim 1 wherein said output plate is engagable with said main brake to engage the same and said pilot brake is operable to ground said output plate to said housing.

3. The pilot operated no-back of claim 2 wherein said input shaft includes a lost motion connection to said input and output plates.

4. The pilot operated no-back of claim 3 wherein said lost motion connection comprises axially directed fingers received in notches in said input and output plates said notches being sufficiently large to accomodate movement of said fingers in arcuate paths of limited length therein.

5. The pilot operated no-back of claim 1 wherein said pilot brake includes an electrical coil in said housing about said input shaft, a ring-like armature about said input shaft and adjacent said coil, said armature being movable toward and away from said coil, a pilot brake plate sandwiched between said armature and a surface of said housing, and means adjacent said armature for biasing said armature toward said surface.

6. The pilot operated no-back of claim 5 wherein said pilot brake plate is splined to said output plate.

7. The pilot operated no-back of claim 1 wherein said plates included ball ramps in facing surfaces thereof and said ball ramps have shallow ramp angles.

8. The pilot operated no-back of claim 7 wherein said shallow ramp angles are in the range of about ten degrees to fifteen degrees.

9. A pilot operated no-back comprising:
   a housing;
   input and output shafts journalled in said housing;
   a brake disc pack within said housing and compressible into connection with said output shaft to prevent rotation of said output shaft;
   a ball ramp mechanism having a rotary input plate coupled to said input shaft and a rotary output plate adjacent said input plate and movable with respect to said input plate to compress said brake disc pack; and
   a selectively operable pilot brake connected to said output shaft for retarding rotation of said output plate.

10. The pilot operated no-back of claim 9 wherein said pilot includes an electric coil and an armature adjacent said coil which is movable relative thereto, said armature serving to connect said pilot to said output plate and said output plate connecting said armature to said output shaft.

11. In an aircraft having movable control surfaces, a control means for selectively preventing movement of said control surfaces as a result of loads applied to said control surfaces, that control means comprising:
    an input shaft means for receiving motive force from a source;
    an output shaft means, connected to said control surfaces, for applying said motive force to said control surfaces;
    a coupling means for interconnecting said input shaft means to said output shaft means to allow transfer of motive force therebetween;
    said coupling means including a brake means and a pilot means;
    said brake means being connected to said output shaft means in response to motive force being applied to said output shaft means as a result of loads applied to said control surfaces, that connection serving to prevent movement of said output shaft means; and
    said pilot means being connected to said brake means so as to selectively disable the connection of said brake means to said output shaft means which prevents movement of said output shaft means, such that loads applied to said control surfaces can, when so selected, apply motive force to said output shaft means and, thereby, to said input shaft means.

12. The invention according to claim 11 wherein said coupling further includes first and second plate members which are relatively movable with respect to each other, said pilot means is connected to said brake means by connection to second plate to control said relative movement, and said second plate is connected to said brake means in response to said relative movement to cause the connection of said brake means to said output shaft means which prevents movement of said output shaft means.

13. The invention according to claim 12 wherein said first and second plate means are configured with respect to each other such that a limited amount of said relative motion is permitted prior to the connection of said brake means to said output shaft means.

14. A no-back apparatus, comprising:

an input shaft means for receiving first motive power from a controllable source;

an output shaft means for transferring said first motive power therethrough and for receiving second motive power from a load source;

a coupling means for interconnecting said input shaft means to said output shaft means to allow the transfer of said first or second motive power therebetween;

said coupling means including a brake means for connection to said output shaft means to permit transfer of said first motive power from said input shaft means to said output shaft means, and to prevent transfer of said second motive power from said output shaft means to said input shaft means; and said coupling means including pilot means, having a connection to said brake means, for selectively preventing connection of said brake means to said output shaft such that transfer of said second motive power to said input shaft means from said output shaft means is permitted.

15. The apparatus according to claim 14 wherein said connection of said pilot means to said brake means comprises:

a ball ramp mechanism having first and second plates which are capable of relative movement with respect to each other, a pilot brake element connected to said second plate, and a selectively movable element connected to said pilot brake element, said second plate being disposed so as to cause actuation of said brake means to prevent said transfer of said second motive power in response to more than a predetermined amount of said relative movement; and said pilot means includes electronic actuation means for controlling said selectively movable element to prevent said relative movement.

* * * * *